United States Patent [19]

Nealon

[11] Patent Number: 5,023,635
[45] Date of Patent: Jun. 11, 1991

[54] DUAL FILM AND STILL VIDEO STUDIO PORTRAIT SYSTEM USING PARALLEL DEDICATED MAGNETIC TRACKS ON FILM

[75] Inventor: James V. Nealon, Rochester, N.Y.

[73] Assignee: Eastman Kodak Company, Rochester, N.Y.

[21] Appl. No.: 370,661

[22] Filed: Jun. 23, 1989

[51] Int. Cl.$^5$ .................. G03B 29/00; G03B 17/24
[52] U.S. Cl. ................................. 354/76; 354/106
[58] Field of Search ............... 354/75, 76, 105, 106, 354/109, 217

[56] References Cited

U.S. PATENT DOCUMENTS

| | | | |
|---|---|---|---|
| 4,716,470 | 12/1987 | Levine | 354/432 |
| 4,811,042 | 3/1989 | Cloutier et al. | 354/105 |
| 4,841,359 | 6/1989 | Hawkins et al. | 354/76 |

Primary Examiner—Russell E. Adams
Assistant Examiner—Jae N. Noh
Attorney, Agent, or Firm—Francis H. Boos, Jr.

[57] ABSTRACT

A dual still video/film portrait system in which the film has a virtually transparent magnetic layer, the camera and the photofinishing system used to develop the film each having magnetic read/write heads and a processor for controlling data recorded and played back in magnetic tracks on the film.

3 Claims, 5 Drawing Sheets

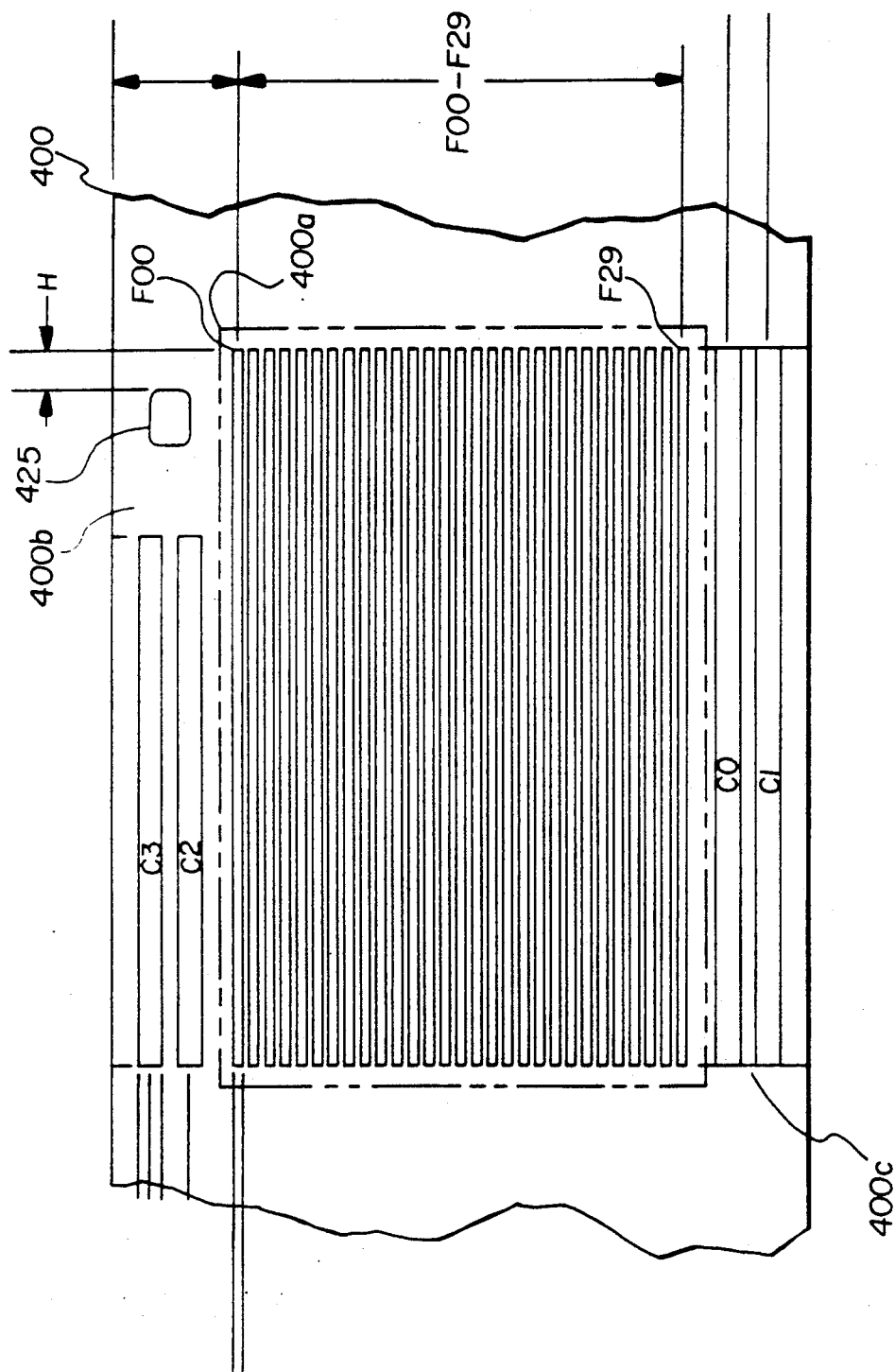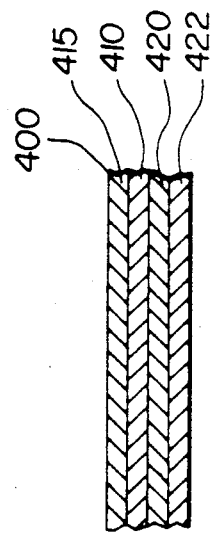

DUAL FILM AND STILL VIDEO STUDIO PORTRAIT SYSTEM USING PARALLEL DEDICATED MAGNETIC TRACKS ON FILM

TECHNICAL FIELD

This invention is related to studio portrait systems in which a still video image is captured simultaneously with the exposure of the portrait subject on a frame of film for rapid proofing.

BACKGROUND OF THE INVENTION

Studio portrait systems in which the same scene is captured simultaneously as a still video image and on a frame of film are well-known in the art. Such systems permit the customer to rapidly proof all of the frames without having to wait for the film to be developed and printed. References of interest in this field include U.S. Pat. No. 4,805,037 to Noble et al. and assigned to the present assignee, U.S. Pat. No. 4,716,470 to Levine, U.S. Pat. No. 4,714,962 to Levine, U.S. Pat. No. 4,738,526 to Larish and assigned to AutoStudio Corporation, European Patent Application No. 0,196,009 to Ishii and assigned to Casio Computer Co., Ltd. and Japanese Patent Application No. JP/63-261,241 assigned to Fuji Photo Film Co., Ltd.

One problem with such systems is that rapid proofing ultimately requires that some correlation be maintained between the still video frame number and the corresponding frame number on the film. Also, the customer's responses upon the rapid video proofing of each still video frame immediately after the photo session need also to be recorded, correlating the response for each frame with the still video frame number and, ultimately, with the film frame number. Customer responses may include the number of prints and any alterations such as cropping, zooming, tele, pan, etc.

Presently, while it is known to record information optically along the film edge adjacent each frame, such a recording technique suffers from the disadvantage that the information can only be recorded with the exposure of the film, and therefore is not easily supplemented. Moreover, such information is not available or retrievable from the film until after the film is has been developed. Accordingly, such a technique is not particularly helpful in tracking information that comes to light following the exposure of the film or finding such information prior to development of the film. As one example, such information would include customer responses following a rapid proofing session of viewing the still video frames.

As a result, in most cases such information is managed by manually writing it in a notebook, including the correlation between still video frame numbers and film frame numbers and the customer comments regarding each frame. The disadvantage of the latter technique is that it requires manual labor on the part of the person maintaining a notebook and is relatively slow, and moreover is not physically tied to either the video tape or the film. Another possibility would be to use the video tape or video storage medium as the medium on which to store such comments. However, this information is likewise not physically tied to the particular film frame.

Accordingly, it is an object of the invention to provide a reliable system for maintaining information concerning simultaneous film/still video portraits in a rapid proofing system, in which the information for each film frame is unambiguously correlated to each film frame in such a manner that it will not be accidentally associated with another film frame.

It is another object of the invention to provide the foregoing information system in which the information can be recorded or retrieved at any time before or after film exposure and before or after film development.

SUMMARY OF THE INVENTION

The invention is a dual still video/film portrait system in which the film has a virtually transparent magnetic layer, the camera and the photofinishing system used to develop the film each having magnetic read/write heads and a processor for controlling data recorded and played back in magnetic tracks on the film. The magnetic tracks extend parallel to the length of the film, each film frame having its own set of magnetic tracks which are in registration with or adjacent the film frame, so that the information recorded therein is unambiguously correlated with that film frame.

In one aspect of the invention, the still video frame number corresponding to the current film frame is automatically recorded through the magnetic head in the camera on the film in a magnetic track adjacent the current film frame. Following the portrait session, the customer's comments responsive to a rapid proofing session of the still video frames on a monitor are transcribed and magnetically recorded using either the magnetic head in the camera or the photofinishing system or other apparatus. The comments, such as requests for a number of prints, cropping and zooming or other alterations are recorded for each frame in those magnetic tracks in registration with or adjacent that frame. In the preferred embodiment of the invention, if a particular comment or instruction is to be recorded in response to the customer's viewing a particular still video frame number, the processor advances the film past the magnetic head, searching in a particular magnetic track dedicated to the purpose of recording the still video frame number on the film until the appropriate still video frame number is found on the film, identifying the corresponding film frame. At that point, the customer information for that frame is immediately recorded on the film through the magnetic head under control of the processor. For this purpose a terminal or similar device may be provided for communicating with the processor and entering the customer information.

In yet another embodiment, the magnetic recording head records information in many parallel tracks within in each frame, there being sufficient tracks in each frame to record one still video frame corresponding to the photographic image recorded in the film frame. In this latter embodiment, the head is of the type well-known in the art which can record in multiple parallel magnetic tracks. Each still video frame (captured from the still video imager at the time the film is exposed to the subject) is taken by the processor and transmitted through the record circuits to the magnetic head as the film is wound to the next frame.

In one embodiment of the invention, a single lens reflex camera is employed, the processor being connected to receive an electrical signal from the camera's shutter release button to actuate the still video imager and controller. In another embodiment of the invention, the film camera and the still video camera are combined in a unitary housing, the processor directly controlling the film camera shutter, the film advance actuator and the video controller in response to electrical signals received from a shutter release button connected directly to the processor.

The photofinishing apparatus of the invention includes a magnetic head and playback circuits, video playback circuits and a still video monitor, all controlled by a processor. The processor also controls the film advance mechanism of the photofinishing apparatus and a print exposure light source. In the preferred embodiment, the still video storage media which recorded the still video images captured by the camera is connected to the photofinishing system video playback circuits. When the film in the photofinishing apparatus is positioned at a certain frame thereof, the processor determines the corresponding still video frame number by reading it from the appropriate magnetic track through the magnetic head, and then commands the video playback circuits to retrieve the corresponding still video image from the still video storage medium for display on a still video monitor prior to exposing the current film frame onto print paper. This process can be operated in reverse, with the customer searching through the still video images for "just the right" image, and as soon as it is found, the photofinisher advances the film while monitoring the appropriate magnetic track location through the magnetic head until locating the film frame having the desired still video frame number recorded therein.

In an embodiment of the invention in which the camera's magnetic head has recorded in each film frame the corresponding still video frame, the photofinishing processor simply plays back the corresponding still video image through the playback magnetic heads, transmitting the data to video playback circuits for display on a still video monitor.

The data is read by the magnetic heads as the film frame is advanced toward the print exposure light source. The magnetic head may also read out other information or data recorded in the magnetic tracks associated with the current frame, such as scene exposure conditions, camera parameters (aperture size, shutter speed) as well as customer comments and corresponding print order requests, if any.

DESCRIPTION OF THE DRAWINGS

The invention is best understood by reference to the accompanying drawings, of which:

FIG. 4 is a plan view of the film employed in the apparatus of FIGS. 1, 2 and 3, showing the location of multiple parallel magnetic tracks recorded therein;

FIG. 5 is a cross-sectional side view of the film of FIG. 4, showing the location of the virtually transparent magnetic layer in the film.

DETAILED DESCRIPTION OF THE INVENTION

Figure 1:
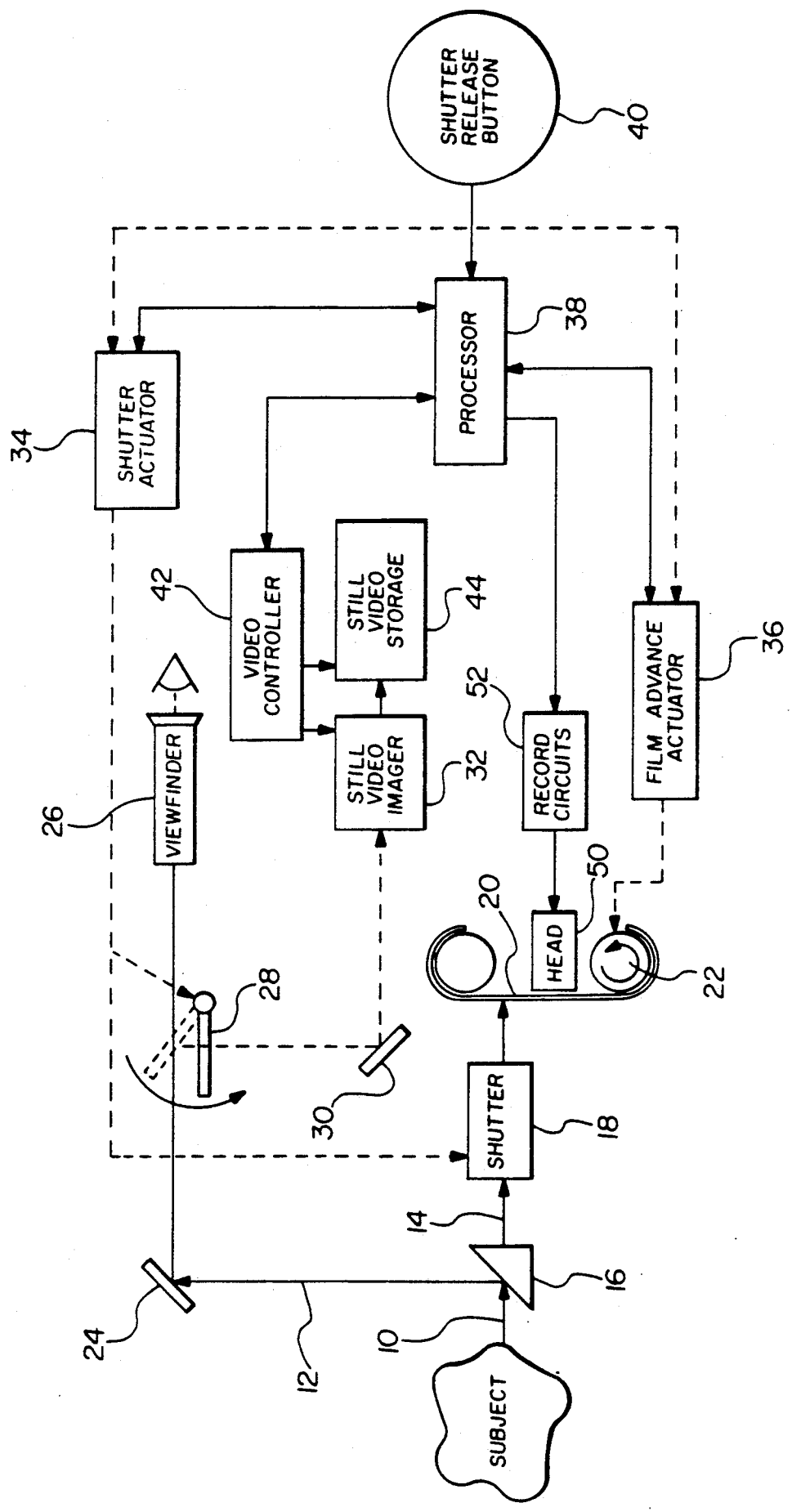
FIG. 1 is a simplified schematic block diagram of a preferred dual video/film camera embodying one aspect of the invention.

Referring first to FIG. 1, light 10 reflected from a subject to be photographed is split into two beams 12, 14 by a beamsplitter or prism 16. The beam 14 is gated by a shutter 18 to expose one frame on a strip of film 20 wrapped around a take-up reel 22. The beam 12 is reflected by a mirror 24 to a viewfinder 26 during those times that the film 20 is not being exposed by the shutter 18. However, each time the shutter 18 is opened to expose the film, a movable mirror 28 pops up in the path of the beam from the mirror 24 to divert it to another mirror 30 and thence to a still video imager 32. Accordingly, a still video image is captured from the beam 10 at the same moment an image is captured on the film 20 from the same beam 10. A shutter actuator 34 of the type well-known in the art synchronizes the flipping of the mirror 28 and the opening of the shutter 18. A film advance actuator 36 of a type well-known in the art causes the take-up reel 22 to wind the film 20 so as to bring the next film frame into registration with the shutter 18 after each exposure. The foregoing is governed by a processor 38 which activates the shutter actuator 34 and then the film advance actuator 36 in sequence each time a shutter release button 40 is depressed by the camera user. In addition, the processor 38 controls a video controller 42 controlling the operation of the still video imager 32 and a still video storage device 44 in a manner well-known in the art. The still video storage device 44 may simply be a buffer memory which stores a still video frame for later magnetic recording on a tape or disk or in magnetic tracks on the film itself. Alternatively, the storage device 44 may itself be a video tape or disk recorder. In one embodiment, the still video storage device 44 includes an analog-to-digital converter and a video frame store digital memory.

The film 20 is distinguished by a virtually transparent magnetic layer therein. Preferably, the virtually transparent magnetic layer is separate from the photosensitive emulsion layer. A magnetic record head 50 having a magnetic gap closely adjacent one surface of the film 20 magnetically records signals produced by record circuits 52. These signals are responsive to information or data transmitted by the processor 38 to the record circuits 52. In accordance with one method of the invention, the processor 38 keeps track of or itself assigns a still video frame number to each image captured in the still video storage device 44. Such a frame number is typically recorded in the still video storage device along with the video image itself. The processor 38 transmits this still video frame number to the record circuits 52 just as the film 20 is wound by the take-up reel 22 toward the next frame. As the film 20 is thus transported past the head 50, the head 50 magnetically records the still video frame number in a location adjacent the corresponding film frame.

In the embodiment of FIG. 1, the location of the shutter 18 may be changed so that the shutter interrupts the beam 10 before it reaches the beamsplitter 16. In this embodiment, the movable mirror 28 would be permanently positioned at its dashed line position illustrated in FIG. 1 while the viewfinder 26 would be eliminated. The advantage of such an alternative embodiment is simply that the shutter 18 not only gates the light to the film but also gates the light to the still video imager 32.

In yet another embodiment of FIG. 1 the shutter release button 40, rather than the processor 38, controls both the shutter actuator 34 and the film advance actuator 36, as indicated in dashed line. In this alternative embodiment, the processor 38 responds to an electrical signal from the shutter release button 40 in actuating the video controller 42. It also monitors the electrical signals from the shutter actuator 34 and the film advance actuator 36 so as to be able to respond in case of an error, such as the failure of the shutter actuator to open the shutter 18 and failure by the film advance actuator 36 to advance the film 20 to the next frame.

Figure 2:
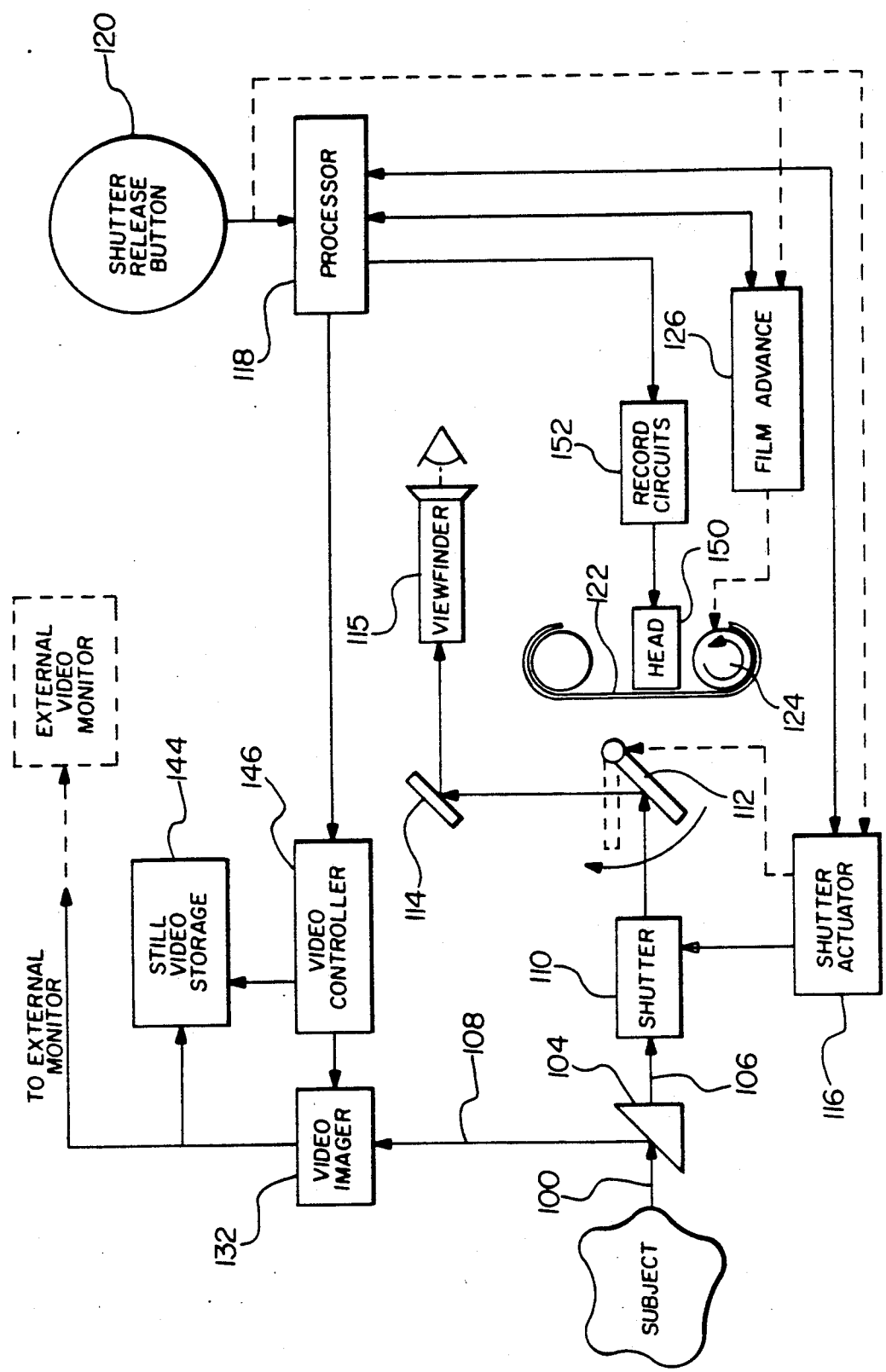
FIG. 2 is a simplified schematic block diagram of another dual video/film camera embodying one aspect of the invention.

Referring to FIG. 2, in another preferred embodiment of the invention, light 100 reflected from a portrait subject to be photographed enters the beamsplitter 104 to be split into two beams 106, 108. The beam 106 enters through a single lens reflex camera shutter assembly of the type well-known in the art, comprising the shutter 110, a movable mirror 112, a viewfinder mirror 114 and a shutter actuator 116. The shutter actuator 116, responding to either an electrical signal from a processor 118 or (in a simpler embodiment indicated in dashed line) an electrical signal from a shutter release button 120, opens the shutter 110 for a predetermined exposure time to a predetermined aperture size, simultaneously flipping the mirror 112 from its solid line position to its dashed line position so as to expose a frame on a strip of film 122 wrapped around a take-up reel 124. In the preferred embodiment of the invention, the processor 118, in response to an electrical signal received from the shutter release button 120 directly controls the shutter actuator 116, as indicated in solid line. In an alternative embodiment of the invention, as indicated in dashed line, the shutter release button 120 directly controls the shutter actuator 116 and a film advance mechanism 126 of the type well-known in the art. In this alternative embodiment, the shutter release button 20, the shutter actuator 116, the film advance device 126, take-up reel 124, the shutter 110, the movable mirror 112, the mirror 114 and the viewfinder 115 are all part of a standard single lens reflex (SLR) camera whose lens assembly (not shown) is integrated with the shutter 110 and faces the beamsplitter 104 so as to receive the split beam 106.

In either the preferred or alternative embodiments of FIG. 2, the processor 118 performs in exactly the same manner as the processor 38 of FIG. 1 to control the video controller 142 governing the video imager 132 and the still video storage device 144 Specifically, the processor 118 of FIG. 2 causes the video imager 132 to capture the current video frame from the beam 108 under control of the video controller 146 in the still video storage device 144. At the same time, the processor 118 causes a sequential still video frame number to be assigned to and recorded with the still video image stored in the device 144. As the film strip 122 is wound on the take-up reel 124 to the next film frame, the processor 118 transmits the still video frame number to record circuits 152 for recording by magnetic heads 150 in the virtually transparent magnetic layer in the film strip 122. As in the embodiment of FIG. 1, the processor 118 may, in addition, magnetically store other information along with the still video frame number on the film 122, such as, for example, customer order information, scene exposure conditions, shutter speed, aperture size, etc., which could facilitate the proper development and print-exposure of the particular film frame.

Figure 3:
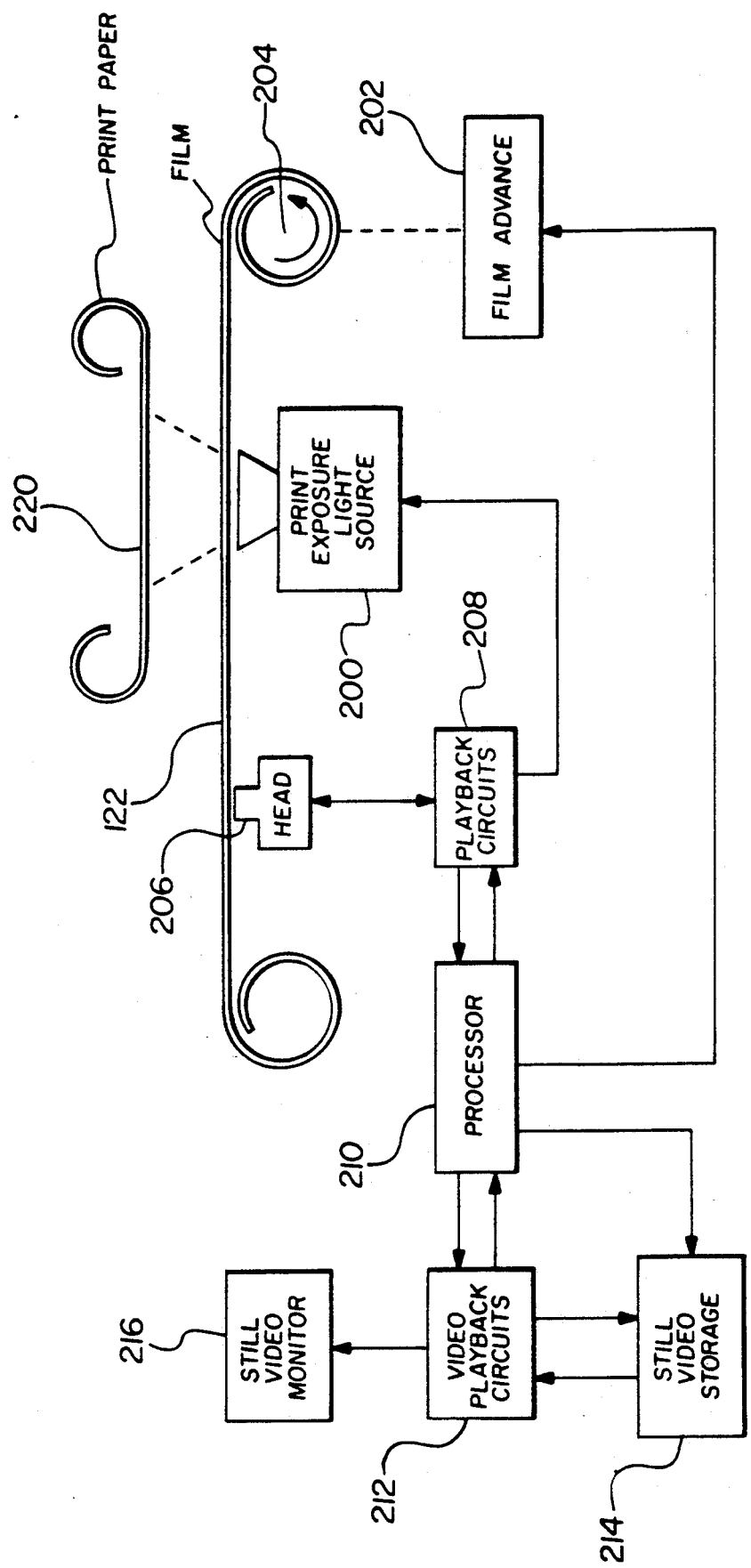
FIG. 3 is a simplified schematic block diagram of a photofinishing system embodying another aspect of the invention.

The photofinishing apparatus of the invention is illustrated in FIG. 3. It includes a print exposure light source 200 of the type well-known in the art, a film advance mechanism 202 of the type well-known in the art, and a take-up reel 204 around which the film 122 is wrapped so as to transport individual frames past the print exposure source 200 in serial sequence. The system further includes a magnetic head 206 and playback circuits 208 connected thereto. A processor 210 controls the film advance mechanism 202, the print exposure light source 200 and the playback circuits 208. In addition, the system includes video playback circuits 212, a still video storage device 214 and a still video monitor 216. The processor 210 determines the corresponding still video frame number for each film frame on the film strip 122 by reading it through the magnetic head 206 from the magnetic tracks adjacent the particular film frame about to be exposed by the light source 201. The Processor 210 transmits the still video frame number to a still video storage device 214 to retrieve the corresponding still video frame for display on the still video monitor 216. Furthermore, any comments recorded in the magnetic tracks adjacent the current film frame of interest may also be read out through the head 206 and displayed on the still video monitor 216 or utilized in any other fashion. Such comments may, for example, include the number of prints to be made of the particular film frame, the camera exposure parameters or the scene exposure conditions at the time the image was captured. The operator may utilize the information to optimize the exposure of the print paper 220 to the image on the current film frame or to print the correct number of prints with the correct print size, magnification or aspect ratio, as may have been specified by the comments magnetically recorded on the film adjacent the current film frame.

Many schemes for recording the parallel magnetic track on the film may be used in connection with the apparatus previously described in connection with FIGS. 1-3. FIGS. 4 and 5 illustrate one way of recording the magnetic track in the magnetic layer in the film. Referring to FIG. 4, the film 400 is composed of a series of periodic frames 400a which are sequentially exposed by the camera shutter. A series of perforations 425 may lie along one or both edges of the film outside the image frame area 400a. Parallel magnetic tracks containing magnetically recorded information pertaining uniquely to a particular film frame 400a are located in the magnetic track locations labeled C0, C1, C2, C3 in FIG. 4. The tracks C0-C3 lie along the periphery 400b, 400c and outside of the image frame 400a, and may therefore be read and recorded in by magnetic heads without significant risk of the magnetic heads damaging the film emulsion layer within the image frame 400a. Each of the tracks C0-C3 is recorded in by the magnetic head 50 of FIG. 1 or the magnetic head 150 of FIG. 2 and is played back by the head 206 of FIG. 3. In a first embodiment of the invention, none of the heads 50, 150 or 206 contacts the image area 400a but is restricted to the edge periphery regions 400b, 400c along each side of the frame 400a. Magnetic heads capable of recording in parallel magnetic tracks singly or simultaneously are well-known in the art and could be employed here to achieve the recording of the parallel tracks C0-C3 of FIG. 4.

In yet another embodiment of the invention, additional tracks F00-F29 are carefully recorded in the image frame 400a in such a manner that the magnetic heads never damage the film emulsion layer during recording or playback. In this latter embodiment of the invention, there are enough tracks associated with each frame 400a to record an analog color video signal (such as an NTSC video signal) comprising both fields of the corresponding still video frame. In this embodiment, the processor 38 of FIG. 1 receives the signal corresponding to the still video image captured concurrently with the exposure of the current film frame and transmits this video signal through the record circuits 52 and the head 50 for recording in tracks F00-F29 in the film strip 400 of FIG. 4.

Magnetic recording in parallel dedicated magnetic tracks on film is disclosed in U.S. Pat. Application Ser. No. 255,693 filed Oct. 7, 1988 by Robert Paul Cloutier et al., and entitled "Film Information Exchange System Using Dedicated Magnetic Tracks On Film" assigned to the present assignee and in the copending U.S. Pat. Applications cross-referenced therein. These applications teach the recording and playing back of data in the parallel magnetic track format illustrated in FIG. 4.

FIG. 5 illustrates the location of the various layers in the film strip 400, including the base layer 422, the film emulsion layer 420, the virtually transparent magnetic layer 410 and a protective layer 415.

In recording the still video frame (signal) in the parallel magnetic tracks which are in registration with the current film frame, either the film or the head may be transported back and forth as the head records in successive ones of the plural parallel tracks, the beginning of the video signal being recorded at the beginning the first track and the end of the video signal being recorded at the end of the last track, beginning at the top of the film frame and ending at the bottom thereof, as one example.

Figure 6:
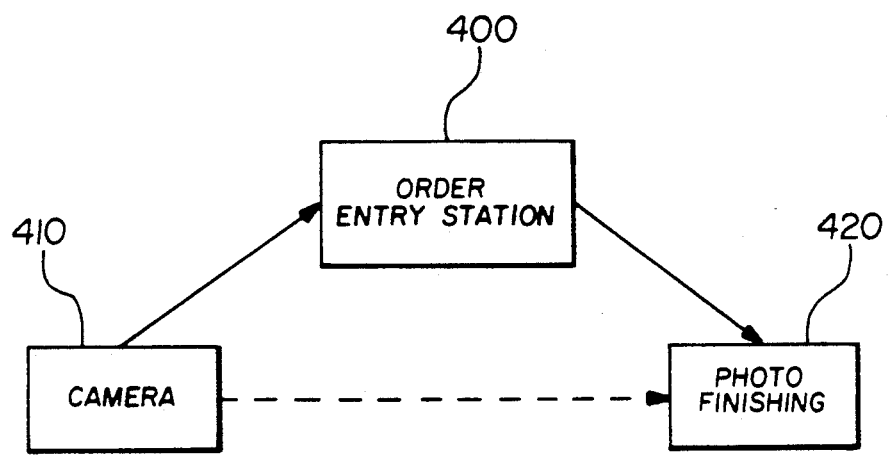
FIG. 6 is a simplified block diagram illustrating an order entry station employed in yet another aspect of the invention.

In the foregoing description, all customer comments and order instructions are recorded magnetically on the film, including those instructions received after exposure of the film. This may entail an undesirable amount of film handling, particularly in the case of frequent modifications to the order by the customer. To reduce film handling, a separate order entry station 400 of FIG. 6 is provided, in addition to the camera 410 of FIG. 2 and the photofinishing system of FIG. 3. The order entry station includes magnetic reading and writing hardware and a storage medium such as a magnetic disk or tape. The magnetic heads in either the camera 410 of FIG. 2 or the photofinishing system 420 of FIG. 3 play back from the film all of the information or data (such as customer order instructions, video frame number, etc.) already recorded on the film, the information being transmitted to the order entry station 400 for magnetic storage. At any time, the instructions stored in the order station 400 may be modified in any fashion as frequently as desired to generate a new instruction. Just before the film is to be printed in the photofinishing system 420, the order entry station plays back the new or modified instructions it now stores, which are transmitted to the photofinishing system 420 for recording on the film. In this manner, the customer may make many separate changes in the instructions recorded on the film without requiring the film to be handled each time. Ultimately, the original instructions are erased from the film as the new instructions are recorded prior to making prints.

While the invention has been described as employing magnetic tracks on film adjacent each film frame for recording certain information such as that correlating the film frame to a still video frame number, customer order information, scene exposure condition and the like, other information not specifically mentioned above may be recorded therein as well, in accordance with the invention. Furthermore, while the recording of information has been disclosed herein as occurring mainly in the camera apparatus illustrated in FIG. 1 or FIG. 2, recording may also occur in the photofinishing system of FIG. 3 or at any step prior to the actual exposure of the print paper 220. The advantage is that information recorded at the time of film exposure to the portrait subject is immediately available to be read back, corrected or supplemented at any time prior to or after development of the film and prior to or after the making of the prints. Thus, following exposure of the film, a customer viewing the still video images may cause his selections or instructions to be recorded magnetically on the film prior to development or printing. This may save unnecessary printing, particularly if the instructions exclude certain frames from printing Furthermore, information regarding the number of enlargements, the size, cropping, pan or zoom may also be recorded at any time prior to or after the making of prints from each frame. Thus, the invention is versatile and is readily adapted to individual needs.

Accordingly, while the invention has been described in detail by specific reference to preferred embodiments thereof, it is understood that variations and modifications may be made without departing from the true spirit and scope of the invention.

What is claimed is:

1. A camera system comprising:
   means for splitting an incoming beam into two beams;
   a strip of film having a virtually transparent magnetic layer therein;
   a still video imager;
   means for simultaneously exposing an image from one of said two beams onto said film to form a latent image frame thereon and for capturing an image from the other of said two beams on said still video imager, said exposing and capturing means including a processor responsive to a shutter release button for controlling the capturing of said image by said still video imager simultaneously with the exposing of said film, said processor including means for determining a still video frame number corresponding to the image captured by said still video imager;
   means responsive to said processor for recording data pertaining to said film frame, including said still video frame number, in a magnetic track on said magnetic layer adjacent said film frame, said recording means being comprised of record circuits connected to said processor and a magnetic head connected to said record circuits, said magnetic head being closely adjacent said film frame; and
   order entry station means for storing order information magnetically played back from said film, for storing subsequent modifications to said order information and for transmitting a modified version of said order information for magnetic recording on said film.

2. The system of claim 1 wherein said magnetic head records said data in plural magnetic tracks mutually parallel to the length of said film, said tracks being in registration with said film frame.

3. The system of claim 2 wherein said processor comprises means for transmitting a still video signal representing said image to said record circuit, whereby said signal is distributed and recorded among said plural parallel magnetic tracks on said film.

* * * * *